(12) United States Patent
Sherburne et al.

(10) Patent No.: US 8,195,944 B2
(45) Date of Patent: Jun. 5, 2012

(54) AUTOMATED METHOD FOR SECURELY ESTABLISHING SIMPLE NETWORK MANAGEMENT PROTOCOL VERSION 3 (SNMPV3) AUTHENTICATION AND PRIVACY KEYS

(75) Inventors: Timothy J. Sherburne, Carol Stream, IL (US); Xiaonong Li, Wheaton, IL (US); Shaokai Wen, Lake Zurich, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 1234 days.

(21) Appl. No.: 11/619,867

(22) Filed: Jan. 4, 2007

(65) Prior Publication Data

US 2008/0168271 A1    Jul. 10, 2008

(51) Int. Cl.
*H04L 9/32* (2006.01)
(52) U.S. Cl. ........ 713/171; 713/156; 717/106; 709/203; 709/224; 709/229; 709/227
(58) Field of Classification Search .................. 713/171, 713/156, 175; 709/203, 224, 229, 227; 717/106
See application file for complete search history.

(56) References Cited

U.S. PATENT DOCUMENTS

| | | | |
|---|---|---|---|
| 7,099,947 B1 * | 8/2006 | Nadeau et al. | 709/229 |
| 7,290,142 B1 * | 10/2007 | Yost | 713/171 |
| 7,370,109 B1 * | 5/2008 | Rohit et al. | 709/227 |
| 2003/0131096 A1 * | 7/2003 | Goringe et al. | 709/224 |
| 2005/0010757 A1 * | 1/2005 | Bosler | 713/156 |
| 2005/0278692 A1 * | 12/2005 | Sridhar et al. | 717/106 |
| 2006/0174018 A1 * | 8/2006 | Zhu et al. | 709/229 |
| 2006/0182282 A1 * | 8/2006 | Negahdar | 380/277 |
| 2006/0200665 A1 | 9/2006 | Olson | |
| 2007/0083665 A1 * | 4/2007 | Miao | 709/230 |
| 2009/0210520 A1 * | 8/2009 | Maeno | 709/221 |

FOREIGN PATENT DOCUMENTS

| | | |
|---|---|---|
| EP | 1341343 B1 | 5/2005 |
| EP | 1216562 B1 | 3/2006 |
| WO | WO 2007/140719 | * 12/2007 |

OTHER PUBLICATIONS

Blumenthal, Request for Comments (RFC) 3414, "User-Based Security Model (USM) for Version 3 of the Simple Network Management Protocol (SNMPv3)", Retrieved From http://www.iett.org/rfc/rfc3414.txt.
PCT Search Report Dated Sep. 22, 2008.

\* cited by examiner

*Primary Examiner* — Kambiz Zand
*Assistant Examiner* — Tongoc Tran
(74) *Attorney, Agent, or Firm* — Randi L. Karpinia; Valerie M. Davis; Kenneth A. Haas

(57) ABSTRACT

In an SNMP network including a Manager Station having a first digital certificate and an Agent Station having a second digital certificate, the MS generates a simple network management protocol (SNMP) configuration file which includes SNMP authentication keys and SNMP encryption keys for use by the MS and the AS for authentication and for encrypting communications between the MS and the AS, respectively. Mutual authentication can be performed using the first and second digital certificates to establish a secure session between the MS and the AS. The MS can encrypt the SNMP configuration file and transmit it to the AS which can then decrypt the encrypted SNMP configuration file to generate the SNMP authentication keys and the SNMP privacy keys. The MS and the AS can then use the SNMP authentication and privacy keys to conduct secure SNMP communications between the MS and the AS.

18 Claims, 3 Drawing Sheets

AUTOMATED METHOD FOR SECURELY ESTABLISHING SIMPLE NETWORK MANAGEMENT PROTOCOL VERSION 3 (SNMPV3) AUTHENTICATION AND PRIVACY KEYS

FIELD OF THE INVENTION

The present invention relates generally to simple network management protocol (SNMP) communications and more particularly to security in simple network management protocol (SNMP) communications.

BACKGROUND

In internetworking and computer network engineering, Request for Comments (RFC) documents are a series of memoranda encompassing new research, innovations, and methodologies applicable to Internet technologies. The Internet Engineering Task Force (IETF) adopts some of the proposals published in RFCs as Internet standards.

The simple network management protocol (SNMP) forms part of the internet protocol suite as defined by the Internet Engineering Task Force (IETF). More specifically, the simple network management protocol (SNMP) is a Layer 7 or Application Layer protocol used by network management systems for monitoring network-attached devices (sometimes called network elements (NEs) or Agents) for conditions that warrant administrative attention. SNMP can be used between a Manager Station (MS) and NEs to manage the NEs. The first Request for Comments (RFCs) for SNMP, now known as Simple Network Management Protocol version 1 (SNMP v1), were criticized for inadequate security. In these RFCs, authentication of clients is performed only by a "community string," in effect a type of password, which is transmitted in cleartext.

More recently, the IETF has recognized Simple Network Management Protocol version 3 (SNMP v3), as defined by RFC 3411-RFC 3418 (also known as STD0062), as the current standard version of SNMP. The official source for RFCs on the World Wide Web is the RFC Editor. One may retrieve almost any individual, published RFC via the following URL: http://www.rfc-editor.org/rfc. In practice, SNMP implementations often support multiple versions: typically SNMPv1, SNMPv2c, and SNMPv3. See RFC 3584 "Coexistence between Version 1, Version 2, and Version 3 of the Internet-standard Network Management Framework."

RFC 3414 defines a SNMPv3 User-based Security Model (USM). RFC 3414 discusses how keys are to set up so that the manager station knows that it can trust a network element, and vice-versa. RFC 3414 states that the initial provisioning of authentication keys and privacy or encryption keys are to be done via an "out-of-band mechanism." This mechanism is not defined within the RFC. However, the "out-of-band mechanism" supported by some third party management platforms as well as some SNMP toolkits for initial provisioning of authentication and privacy keys is manually input by an operator.

FIG. 1 is a message flow diagram showing an exemplary network architecture and a message flow and processing 100 for configuring SNMPv3 authentication and privacy keys for use between a Manager Station 120 and an Agent Station 140 which communicate over a communication link 130.

The Agent Station 140 may comprise any network element (NE) including, for example, a master agent or subagent. A master agent is a piece of software running on an SNMP-capable network component that responds to SNMP requests from the management station. A master agent relies on subagents to provide information about the management of specific functionality. A subagent is a piece of software running on an SNMP-capable network component that implements the information and management functionality defined by a specific Management Information Base (MIB) of a specific subsystem, for example, the Ethernet link layer. Some capabilities of the subagent include gathering information from master agents, configuring parameters of the master agents, responding to managers' requests, and generating alarms or traps.

The Manager Station 120 may comprise any type of management station, and can issue requests for management operations on behalf of an administrator or application and receives traps from agents as well.

According to the approach shown in FIG. 1, as shown by arrow 160, an administrator would manually enter initial keys (e.g., pass-phrase strings corresponding to the initial SNMPv3 authentication keys and initial SNMPv3 privacy keys) at the Manager Station 120, and as shown by arrow 170, a technician installing equipment would manually enter initial keys at the Agent Station 140. For example, in most cases, the administrator informs the technician via phone, etc. of what the initial key is. If there is a communication error between the administrator and the technician such that the technician enters the wrong key, then the configuration process will fail since the keys entered at the Manager Station 120 and Agent Station 140 must be identical. At arrow 180, the new SNMPv3 authentication and privacy keys can then be used by the Manager Station 120 and the Agent Station 140 during secure SNMPv3 communications.

BRIEF DESCRIPTION OF THE FIGURES

The accompanying figures, which together with the detailed description below are incorporated in and form part of the specification, serve to further illustrate various embodiments and to explain various principles and advantages all in accordance with the present invention.

Figure 1:
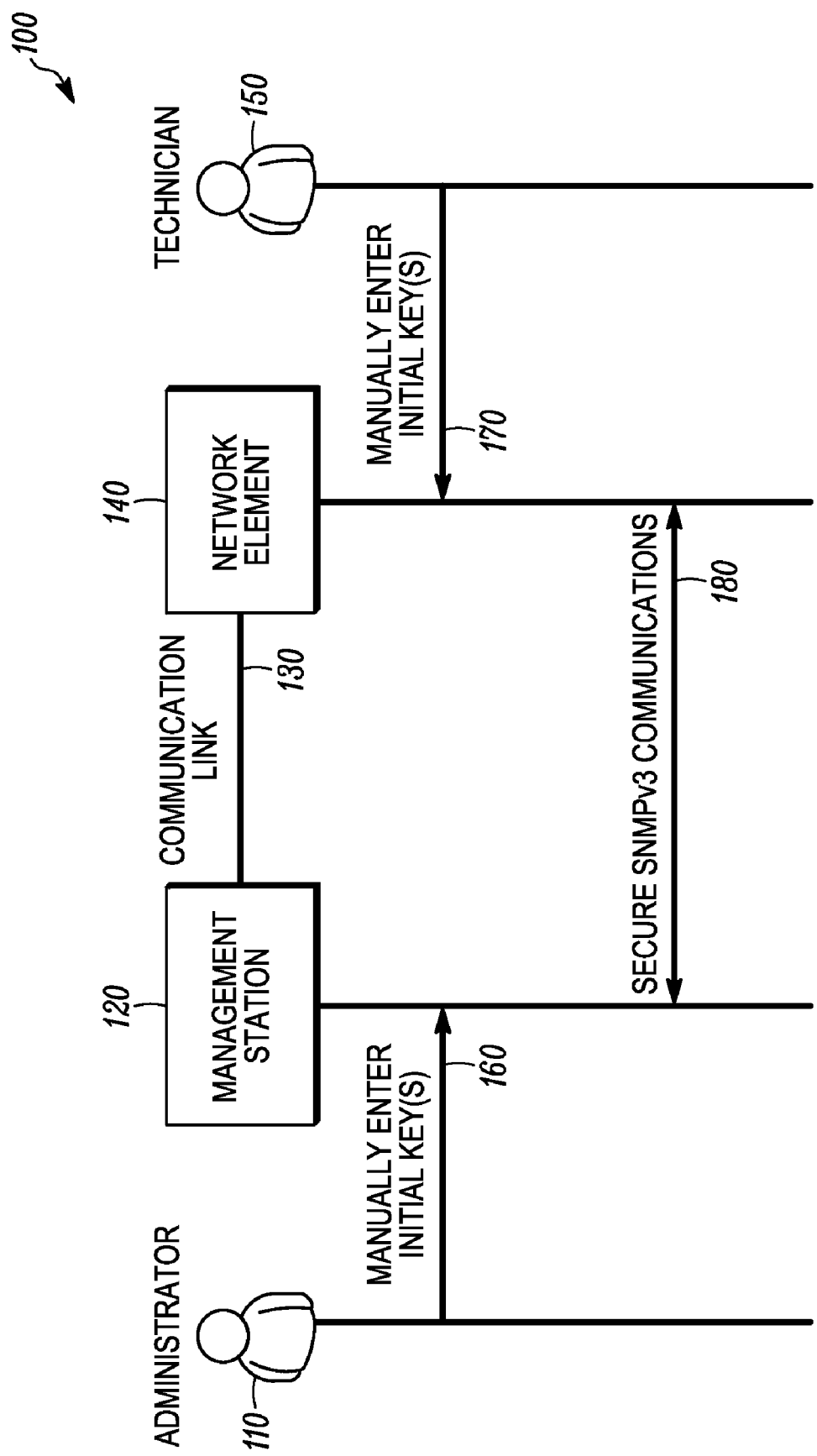
FIG. 1 is a message flow diagram showing an exemplary network architecture and a message flow and processing for configuring SNMPv3 authentication and privacy keys at a Manager Station and an Agent Station.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method steps and apparatus components related to establishing SNMPv3 keys between a management station and a network element. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

It will be appreciated that embodiments of the invention described herein may be comprised of one or more conventional processors and unique stored program instructions that control the one or more processors to implement, in conjunction with certain non-processor circuits, some, most, or all of the functions for establishing SNMPv3 keys between a management station and a network element as described herein. The non-processor circuits may include, but are not limited to, a radio receiver, a radio transmitter, signal drivers, clock circuits, power source circuits, and user input devices. As such, these functions may be interpreted as steps of a method for establishing SNMPv3 keys between a management station and a network element. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily designed to allow generating such software instructions and programs and ICs with minimal experimentation.

The following detailed description is merely exemplary in nature and is not intended to limit the invention or the application and uses of the invention. The word "exemplary" is used herein to mean "serving as an example, instance, or illustration." Any embodiment described herein as "exemplary" is not necessarily to be construed as preferred or advantageous over other embodiments. All of the implementations described below are exemplary implementations provided to enable persons skilled in the art to make or use the invention and are not intended to limit the scope of the invention which is defined by the claims.

Overview

This "Overview" is provided to introduce a selection of concepts in a simplified form that are further described below. This "Overview" is not intended to identify key features or essential features of the claimed subject matter, nor is it intended to limit the scope of the claimed subject matter.

The manual input process involved in manually configuring the SNMPv3 authentication and privacy keys is very cumbersome and error prone for large systems. Additionally, the manual input process exposes the keys to people such as administrators and technicians, and opens the management interface to potential security attacks.

To help improve security in some SNMP v3 implementations, a Diffie-Hellman method can be used to set up a SNMPv3 security credential. During the Manager Station (MS) initialization process, the Manager Station (MS) generates a private random value, calculates the public value, and stores the public value in a configuration file at a Trivial File Transfer Protocol (TFTP) server. During registration, the Agent Station (AS) downloads the configuration file, generates a private random value, calculates the public value and the shared secret, derives the SNMPv3 authentication and encryption keys from the shared secret, and configures a User-based Security Model (USM) table. At the end of the registration, the Manager Station (MS) uses a SNMPv3 get command with No Authorization No Privacy (noAuthnoPriv) to read the Agent Station's public value. The Manager Station (MS) then calculates the shared secret, and uses the shared secret to derive the SNMPv3 authentication and encryption keys. However, according to this approach, the Agent Station (AS) does not authenticate the Manager Station (MS), and the Manager Station (MS) does not authenticate the Agent Station (AS). An attacker can impersonate as the Manager Station (MS) to the Agent Stations (ASs), and vice-versa, allowing the attacker to read the traffic between the Manager Station (MS) and the Agent Stations (AS).

To help improve security in other SNMP v3 implementations, SNMPv1/v2 can be used to set up the initial SNMPv3 user account and its security credential. Then new SNMPv3 account and its security credential can then be set up with the initial SNMPv3 account. However, if an attacker records the SNMPv1/v2 traffic between Manager Station (MS) and Agent Stations (ASs), the attacker can obtain the SNMPv3 security credentials, can read the traffic, and then inject and/or manipulate the traffic.

To help address the issues in the above-described approaches, an automated method is provided for securely establishing SNMPv3 authentication keys and privacy keys (also known as encryption keys) between a management station and a network element. In this context, "establishing" refers to either initial configuration of SNMPv3 authentication keys and privacy keys and/or periodic updating of SNMPv3 authentication keys and privacy keys for enhanced security.

According to this method, digital certificates are preloaded into the management station and the network element before deployment. The management station automatically generates the initial SNMPv3 keys, and stores the initial keys in a protected configuration file. As such, no manual configuration is necessary, and the keys are not exposed to administrators or technicians.

The management station and the network element mutually authenticate using their digital certificates. After mutually authenticating, the management station and the network element use a secure file transfer protocol to provide the SNMPv3 authentication and privacy keys to the network element.

Thus, because the initial keys are not manually configured, the initial keys are not exposed to third parties, and because the keys are auto-generated by the management station, the keys are cryptographically strong.

Figure 2:
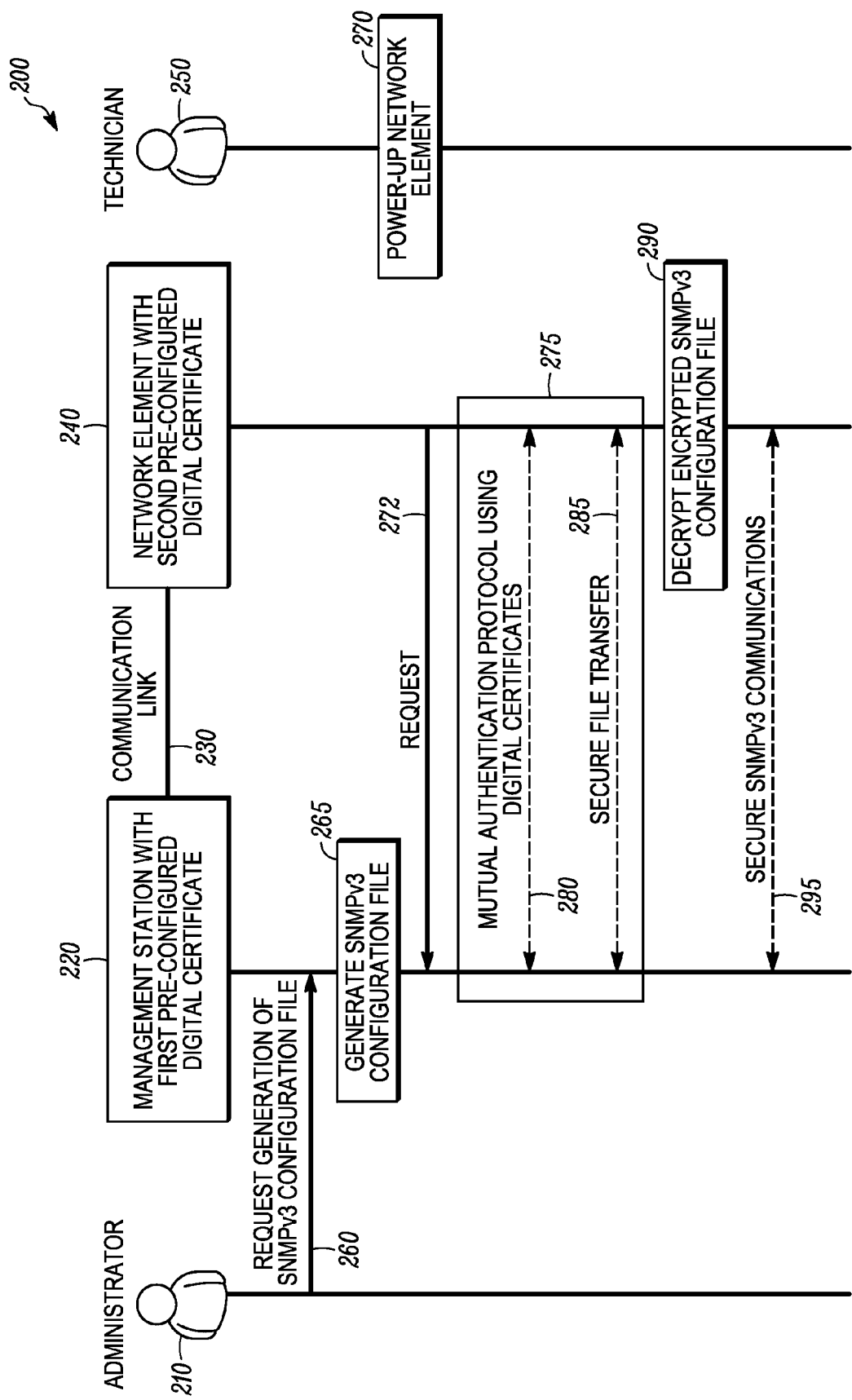
FIG. 2 is a message flow diagram showing an exemplary automated message flow and processing for securely establishing SNMPv3 keys for use by a Manager Station and an Agent Station in accordance with some embodiments of the invention.

FIG. 2 is a message flow diagram showing an exemplary automated message flow and processing 200 for securely establishing initial SNMPv3 keys between a Manager Station 220 and an Agent Station 240 in a SNMPv3 management system network in accordance with some embodiments of the invention. Message flow and processing 200 uses a secure file transfer protocol (SFTP) between the Manager Station 220 and the Agent Station 240 with mutual authentication based upon digital certificate technology to provide the initial SNMPv3 keys (e.g., authentication and privacy keys). Examples of SFTPs include the secure hypertext transfer protocol (HTTPs) and File Transfer Protocol Secure (FTPS) both using secure socket layer (SSL), Secure Copy Protocol (SCP) and Secure File Transfer Protocol (SFTP), and both using secure shell (SSH).

As will be appreciated by those skilled in the art, SSH refers to a set of standards and an associated network protocol that allows establishing a secure channel between a local and a remote computer. SSH uses public-key cryptography to authenticate the remote computer and (optionally) to allow the remote computer to authenticate the user. SSH provides confidentiality and integrity of data exchanged between the two computers using encryption and message authentication codes (MACs). SSH is typically used to log into a remote machine and execute commands, but it also supports tunneling, forwarding arbitrary Transmission Control Protocol (TCP) ports and X11 connections; it can transfer files using the associated SFTP or SCP protocols. In the context of SSH, the Secure Copy Protocol (SCP) is a means of securely transferring computer files between a local and a remote host or between two remote hosts, using the Secure Shell (SSH) protocol. In the context of SSH, the Secure File Transfer Protocol (SFTP) is a network protocol that provides file transfer and manipulation functionality over any reliable data stream. SFTP is typically used with the SSH-2 protocol to provide secure file transfer.

Prior to describing the message flow and processing 200, a description of the various entities in the management system network shown in FIG. 2 will be provided.

The management system comprises an administrator 210, a management or Manager Station (MS) 220, an Agent Station (AS) 240, and a user 250, such as a technician.

The management or Manager Station (MS) 220 is a computer with a database that manages various network elements (NEs) that are part of the network including the AS 240. The Manager Station (MS) 220 can be any machine which manipulates data according to a list of instructions (e.g., a program). The Manager Station (MS) 220, for example, can be implemented on a network server computer.

The Manager Station (MS) 220 typically includes at least some form of computer readable media. Computer readable media can be any available media that can be accessed by MS 220 and/or by applications executed by MS 220. By way of example, and not limitation, computer readable media may comprise computer storage media and/or communication media. Computer storage media can include volatile, non-volatile, removable, and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by MS 220. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared and other wireless media. Combinations of the any of the above are also included within the scope of computer readable media.

In its most basic configuration, MS 220 includes at least one processing unit and a suitable amount of memory for implementing a database. The processing unit in the Manager Station (MS) 220 implements computer-executable instructions, such as program modules, executed by one or more computers or other devices. Generally, program modules include routines, programs, objects, components, data structures, and/or other elements that perform particular tasks or implement particular abstract data types. Depending on the exact configuration and type of the MS 220, the memory may be volatile (such as RAM), non-volatile (such as ROM, flash memory, etc.) or some combination of the two. Additionally, MS 220 may also have additional features/functionality. For example, MS 220 may also include additional storage (removable and/or non-removable) including, but not limited to, magnetic or optical disks or tape. Memory, removable storage, and non-removable storage are all examples of computer storage media as defined above.

The Manager Station (MS) 220 includes communications connection(s) that allow the MS 220 to communicate with other devices. Communications connection(s) may be associated with the handling of communication media as defined above. The Manager Station (MS) 220 can also include or communicate with input device(s) such as a keyboard, mouse or other pointing device, voice input device, a pen, stylus or other input device, etc. The Manager Station (MS) 220 can also include or communicate with output device(s) such as a display, speakers, printer, or the like. All of these devices are well known in the art and therefore will not be discussed in detail herein.

The AS 240 can be any network element which manipulates data according to a list of instructions (e.g., a program). The AS 240 can be implemented, for example, in computers which include, for example, a cellular base station (BS) or Base Site Transceiver (BTS), an access point (AP), a Base Site Controller (BSC), an Internet Protocol (IP) Router, or an IP Switch, a Home Location Register (HLR), and/or a Visitor Location Register (VLR). The AS 240 can generally include many of the same elements as described above with respect to the MS 220, such as computer readable media that can be accessed by AS 240 and/or by applications executed by AS 240, at least one processing unit which implements computer-executable instructions, communications connection(s) or interface(s) that allow the AS 240 to communicate with other devices, input device(s), and output device(s). For sake of brevity, the description of those components will not be repeated with respect to the AS 240.

According to the message flow and processing 200 in FIG. 2, first and second digital certificates are pre-loaded into or pre-configured on the Manager Station 220 and the Agent Station 240, respectively. For example, the first and second digital certificates can be pre-configured or pre-loaded during initial manufacturing or at a secure staging area before deployment of the Manager Station 220 and/or the Agent Station 240. In general, a digital certificate establishes credentials of the associated Manager Station 220 and/or Agent Station 240. In one implementation, each of the digital certificates can comply with the X.509 Standard. X.509 is published as International Telecommunication Union (ITU) recommendation ITU-T X.509 (formerly CCITT X.509) and ISO/IEC/ITU 9594-8 which defines a standard certificate format for public key certificates and certification validation. The Public-Key Infrastructure (X.509) working group (PKIX) is a working group of the Internet Engineering Task Force dedicated to creating RFCs and other standards documentation on issues related to public key infrastructure based on X.509 certificates. PKIX was established in autumn 1995. A copy of the X.509 Standard can be obtained at the following URL: http://www.itu.int/rec/T-REC-X.509/en.

As will be described below, the pre-configured first and second digital certificates can be used to initially configure the authentication and privacy keys used in the SNMPv3.

The message flow and processing 200 starts at arrow 260, when the administrator 210 of the management system submits a request to the Manager Station 220, for example, via a user interface (UI) displayed on the Manager Station 220, to generate a SNMPv3 configuration file. The request can include some basic configuration information about SNMPv3, such as the desired security level, time interval of re-keying, etc. For instance, the security level can be set as one of the following three exemplary options: (1) no authentication and privacy (e.g., encryption) is not used, (2) authentication required and privacy (e.g., encryption) is not used, or (3) authentication required and privacy (e.g., encryption) is used).

In response to the request 260, at block 265 the Manager Station 220 can use the information included in the request to automatically generate SNMP parameters, and store the SNMP parameters in the configuration file or "SNMPv3 configuration file." The SNMP parameters are parameters required by the Manager Station 220 and the Agent Station 240 to set-up their SNMP session. For example, the SNMP parameters can comprise: a user name of the Manager Station 220, a user name of the Agent Station 240, the security level (described above) to be used by the Manager Station 220 and the Agent Station 240, randomly generated initial, pre-shared SNMPv3 authentication keys to be used by the Manager Station 220 and the Agent Station 240 for authentication, randomly generated, pre-shared SNMPv3 privacy or encryption keys to be used by the Manager Station 220 and the Agent Station 240 for encryption, Engine Identifier, Authentication Protocol to be used by the Manager Station 220 and the Agent Station 240, Privacy Protocol to be used by the Manager Station 220 and the Agent Station 240, etc. Thus, according to this method, because there is no manual configuration, the SNMPv3 keys are not exposed to third parties. Because the keys are auto-generated by the Manager Station 220, the keys are cryptographically strong.

Independent of the generation of the SNMPv3 configuration file, when the user 250, such as a technician, power-ups, installs or deploys the Agent Station 240 in the network, as indicated at Block 270, the Agent Station 240 will initiate a Dynamic Host Configuration Protocol (DHCP) exchange by sending a DHCP request to a DHCP server for an Internet Protocol (IP) address from the DHCP server, and will also determine the IP address of the Manager Station 220 using information provided in the DHCP response from the DHCP server. Once the Agent Station 240 has the IP address of the Manager Station 220, the Agent Station 240 can also generate an SNMPv3 key establishment request, and transmit the SNMPv3 key establishment request to the Manager Station 220 at arrow 272.

When the Manager Station 220 receives the SNMPv3 key establishment request, the Manager Station 220 can trigger a secure file transfer protocol (SFTP) as shown at Block 275. According to one exemplary implementation, the secure file transfer protocol (SFTP) 280 can be the secure hypertext transfer protocol (HTTPS) as specified in Request for Comments (RFC) 2818. As known to those skilled in the art, HTTPS can be used to mutually authenticate two stations using digital certificates, and then negotiate a session key which can be used by the two stations to encrypt/decrypt information transferred between the two stations over a Wide Area Network (WAN) such as the Internet. HTTPS is syntactically identical to the http: scheme normally used for accessing resources using HTTP. Using https: the URL indicates that HTTP is to be used, but with a different default port (443) and an additional encryption/authentication layer between HTTP and TCP. HTTPS uses a Secure Socket Layer (SSL) or similar encryption protocol invoked on a Web server that uses HTTPS. Those skilled in the art will appreciate that other practical embodiments may be practiced in conjunction with other file transfer protocols and that the HTTPS file transfer protocol described in conjunction with FIG. 2 represents only one exemplary implementation.

As shown at arrow 280 of Block 275, the Agent Station 240 and the Manager Station 220 can mutually authenticate using their respective digital certificates to set-up a secure session between the Manager Station 220 and the Agent Station 240. The Manager Station 220 uses the digital certificate received from the Agent Station 240 to verify that the Agent Station 240 is who it claims to be. Likewise, the Agent Station 240 can use the digital certificate received from the Manager Station 220 to verify that the Manager Station 220 is who it claims to be.

Once mutual authentication is complete and a secure session is set-up between the Manager Station 220 and the Agent Station 240, then the Agent Station 240 (or the Manager Station 220) can then initiate a secure file transfer (SFT) with the Manager Station 220 (or the Agent Station 240) in accordance with a secure file transfer protocol (SFTP). As indicated at arrow 285, the Agent Station 240 can fetch or "download" the SNMPv3 configuration file from the Manager Station 220. According to one exemplary implementation of the SFT, the Manager Station 220 and the Agent Station 240 can negotiate a temporary session key, and the Manager Station 220 can use the temporary session key to encode or encrypt the SNMPv3 configuration file before sending it to the Agent Station 240. As noted above the configuration file comprises the SNMP parameters which include the randomly generated initial, pre-shared SNMPv3 authentication keys to be used by the Manager Station 220 and the Agent Station 240 for authentication, and the randomly generated initial, pre-shared SNMPv3 privacy or encryption keys to be used by the Manager Station 220 and the Agent Station 240 for encryption. As such, the initial SNMPv3 authentication and privacy keys are preferably encrypted before they transferred to the Agent Station 240. When the Agent Station 240 receives the encrypted SNMPv3 configuration file from the Manager Station 220, the Agent Station 240 can then use the temporary session key decode or decrypt the encrypted SNMPv3 configuration file.

After decryption, as shown at block 290, the Agent Station 240 now has the SNMPv3 configuration file including the initial SNMPv3 authentication and privacy keys used to encrypt data between the Manager Station 220 and the Agent Station 240.

As indicated by arrow 295, once the Agent Station 240 has the SNMPv3 authentication and privacy keys, the Agent Station 240 and the Manager Station 220 can use these keys to conduct secure SNMPv3 communications between the Manager Station 220 and the Agent Station 240. The SNMPv3 authentication key is used to authenticate. The SNMPv3 privacy key is used to encrypt/decrypt.

Although not shown in FIG. 2, in addition to initial key provisioning, this same message flow and processing 200 can be used to re-key or periodically update the SNMPv3 keys thereby providing enhanced network security.

Figure 3:
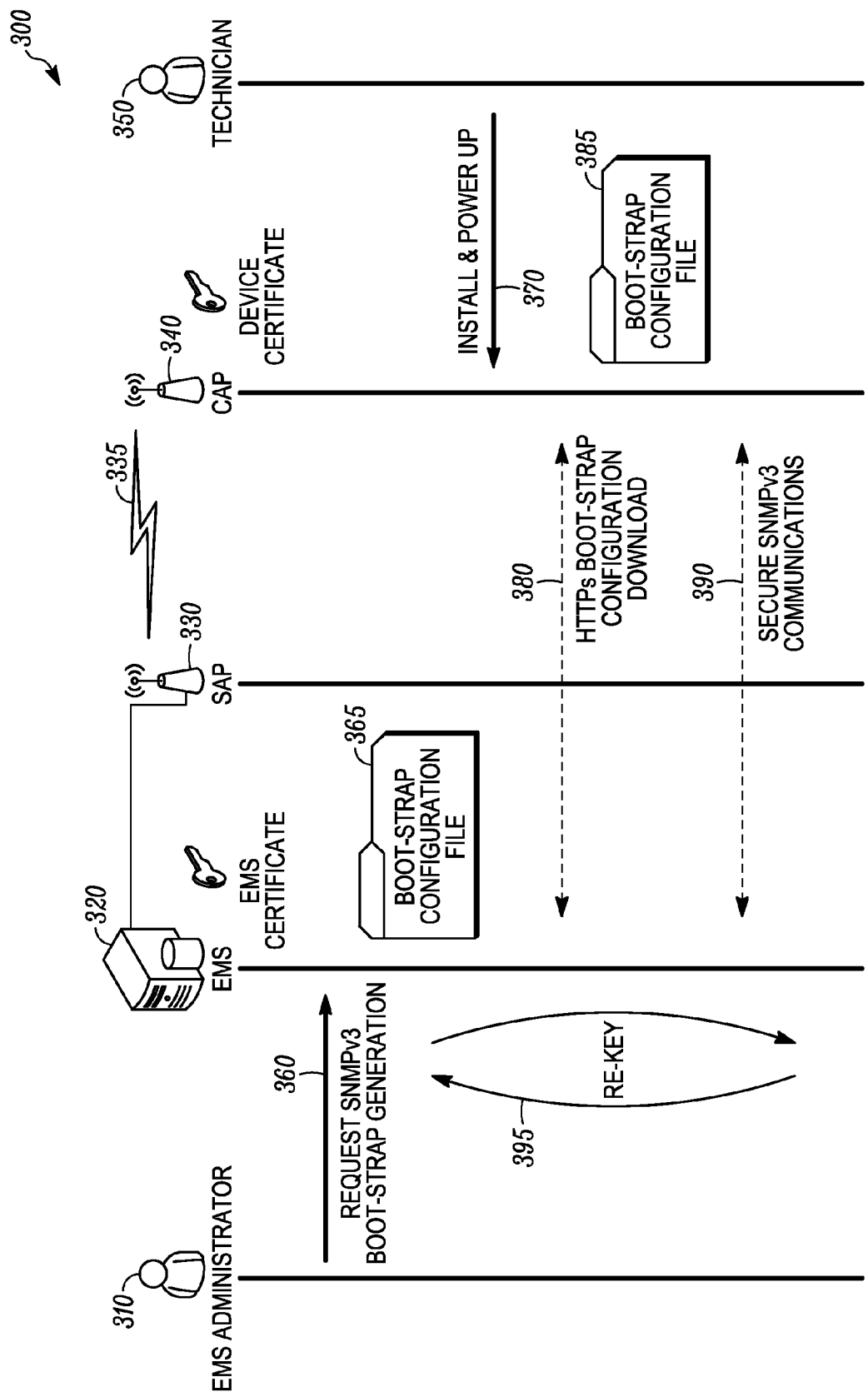
FIG. 3 is a message flow diagram showing an exemplary automated message flow and processing for securely establishing SNMPv3 authentication and privacy keys for use by a Manager Station and an Agent Station in accordance with some embodiments of the invention.

FIG. 3 is a message flow diagram showing an exemplary automated message flow and processing 300 for securely establishing initial SNMPv3 authentication keys and initial SNMPv3 privacy keys between a Manager Station 320 and an Agent Station 340 in a SNMPv3 management system in accordance with some embodiments of the invention. FIG. 3 illustrates how the techniques described above with reference to FIGS. 2 and 3 can be applied in one exemplary network configuration which comprises an Element Management System (EMS) 320, a Smart Access Point (SAP) or Intelligent Access Point (IAP) 330 that is wired to the EMS 320, and a Coverage Access Point (CAP) 340 which communicates with the EMS 320 via the Access Point 330 over a wireless connection or link.

In this specific implementation, the Manager Station 320 is referred to as an "Element Management System (EMS)." The EMS 320 is a server (or other computer) which performs element management functions such as Fault, Configuration and Performance management. The administrator 310 is a person who operates the EMS 320. The EMS 320 can be a dedicated network server or part of another network server in a service provider's network that offers the wireless network. The EMS 320 has a database which can be used to keep track of the various network elements (NEs) which are supervised by the EMS 320. The EMS 320 has a user interface which allows the EMS administrator 310 to control the EMS and manage the various network elements (NEs) which are supervised by the EMS 320. In this particular example, two of the NEs 330, 340 managed by the EMS 320 are shown, however, it will be appreciated that in many practical implementations the EMS 320 can be responsible for hundreds or thousands of different NEs. The EMS 320 is pre-configured or pre-loaded with a EMS certificate.

The Access Point 330 can be, for example, a Smart Access Point (SAP) or Intelligent Access Point (IAP) that has a wired connection back to the EMS 320. In addition, while the EMS 320 is shown as communicating with a Meshed Access Point (MAP) or Coverage Access Point (CAP) 340, it will be appreciated that in other implementations, the Coverage Access Point (CAP) 340 could be any other network element (NE) or Agent Station (AS), and that the Coverage Access Point (CAP) 340 demonstrates one exemplary implementation.

The Coverage Access Point (CAP) 340 can be mobile, and communicates with the EMS 320 via the Access Point 330 over a wireless connection or link 335. The Coverage Access Point (CAP) 340 is pre-configured or pre-loaded with a device digital certificate. The technician 350 is a person who initially deploys or installs the Coverage Access Point (CAP) 340, and who repairs the Coverage Access Point (CAP) 340 if it has problems once it is deployed.

An EMS digital certificate and a device digital certificate are pre-loaded into or pre-configured on the EMS 320 and the CAP 340, respectively. For example, the EMS digital certificate and the device digital certificate can be pre-configured or pre-loaded during initial manufacturing or at a secure staging area before deployment of the EMS 320 and the CAP 340. In general, a digital certificate establishes credentials of the EMS 320 and the CAP 340. In one implementation, each of the digital certificates can comply with the X.509 Standard. As will be described below, the pre-configured EMS digital certificate and the device digital certificate can be used to initially configure the authentication and privacy keys used in the SNMPv3.

The message flow 300 starts at arrow 360, when the administrator 310 of the management system submits a request to the EMS 320, for example, via a user interface (UI) displayed on the EMS 320, to generate a SNMPv3 configuration file. In response to the request 360, the EMS 320 can use the information included in the request to automatically generate SNMP parameters, and store the SNMP parameters in the configuration file 365 or "SNMPv3 configuration file." The SNMP parameters are parameters required by the EMS 320 and the CAP 340 to set-up their SNMP session. Among other things, the SNMP parameters comprise: randomly generated initial, pre-shared SNMPv3 authentication keys to be used by the EMS 320 and the CAP 340 for authentication, randomly generated initial, pre-shared SNMPv3 privacy or encryption keys to be used by the EMS 320 and the CAP 340 for encryption. Thus, according to this method, because there is no manual configuration, the initial SNMPv3 keys are not exposed to third parties. Because the keys are auto-generated by the EMS 320, the keys are cryptographically strong.

Independent of the generation of the SNMPv3 configuration file, when the technician 350 power-ups, installs or deploys the CAP 340 in the network, as indicated at arrow 370, the CAP 340 will initiate a Dynamic Host Configuration Protocol (DHCP) exchange by sending a DHCP request to a DHCP server for an Internet Protocol (IP) address from the DHCP server, and will also determine the IP address of the EMS 320 using information provided in the DHCP response from the DHCP server. Once the CAP 340 has the IP address of the EMS 320, the CAP 340 can initiate a secure file transfer protocol (SFTP) with the EMS 320 by transmitting a request to the EMS 320 via the SAP 330 which triggers a secure file transfer protocol (SFTP) between the EMS 320 and the CAP 340. In one implementation, the secure file transfer protocol (SFTP) can be the secure hypertext transfer protocol (HTTPS). The EMS 320 and the CAP 340 can use the EMS digital certificate and the device digital certificate to mutually authenticate and set-up a secure session between the EMS 320 and the CAP 340. As indicated at arrow 380, the CAP 340 can fetch or "download" the SNMPv3 configuration file from the EMS 320.

After decryption, the CAP 340 now has the SNMPv3 configuration file 385 including the initial SNMPv3 authentication used to authenticate the EMS 320 and the CAP 340, and SNMPv3 privacy keys used to encrypt/decrypt information transmitted between the EMS 320 and the CAP 340.

As indicated by arrow 390, once the CAP 340 has the SNMPv3 authentication and privacy keys, the CAP 340 and the EMS 320 can use these keys to conduct secure SNMPv3 communications between the EMS 320 and the CAP 340.

The arrows 395 are shown to indicate that, in addition to initial key provisioning, this same method can be used to re-key or periodically update the SNMPv3 keys thereby providing enhanced network security. In some implementations, re-keying can be triggered via manual operator request, while in other embodiments re-keying can be triggered via an automated security policy.

In the foregoing specification, specific embodiments of the present invention have been described. However, one of ordinary skill in the art appreciates that various modifications and changes can be made without departing from the scope of the present invention as set forth in the claims below.

Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

The invention claimed is:

1. In a network comprising a Manager Station having a first digital certificate and an Agent Station having a second digital certificate, a method comprising:
   generating a simple network management protocol (SNMP) configuration file at the Manager Station, wherein the SNMP configuration file comprises SNMP authentication keys to be used by the Manager Station and the Agent Station for authentication, and SNMP encryption keys to be used by the Manager Station and the Agent Station for encrypting communications between the Manager Station and the Agent Station;
   mutually authenticating based on the first digital certificate and the second digital certificate to establish a secure session between the Manager Station and the Agent Station;
   encrypting the SNMP configuration file at the Manager Station, and in response to the secure session being established, transmitting by the Manager Station, the encrypted SNMP configuration file to the Agent Station;
   decrypting the encrypted SNMP configuration file at the Agent Station to generate the SNMP authentication keys and the SNMP encryption keys; and
   conducting secure SNMP communications between the Manager Station and the Agent Station using the SNMP authentication and encryption keys.

2. The method according to claim 1, wherein using the SNMP authentication and encryption keys to conduct secure SNMP communications between the Manager Station and the Agent Station, further comprises:
   using the SNMP authentication keys to authenticate between the Manager Station and the Agent Station.

3. The method according to claim 1, wherein using the SNMP authentication and encryption keys to conduct secure SNMP communications between the Manager Station and the Agent Station, further comprises:
   using the SNMP encryption keys to encrypt communications between the Manager Station and the Agent Station.

4. The method according to claim 1, further comprising:
   submitting a request to the Manager Station to generate the SNMP configuration file, wherein the request comprises SNMP configuration information comprising a desired security level to be used by the Manager Station and the Agent Station, wherein the desired security level comprises one of: (1) no authentication and encryption is not used, (2) authentication required and encryption is not used, and (3) authentication required and encryption is to be used.

5. The method according to claim 1, further comprising:
   transmitting a request from the Agent Station for a secure file transfer protocol (SFTP) with the Manager Station, wherein the secure file transfer protocol (SFTP) comprises a secure file transfer protocol (SFTP) which uses certificate based authentication.

6. A Manager Station having a first digital certificate, the Manager Station comprising:
   a processor designed to generate a simple network management protocol (SNMP) configuration file, wherein the SNMP configuration file comprises SNMP authentication keys to be used by the Manager Station and an Agent Station for authentication, and SNMP encryption keys to be used by the Manager Station and the Agent Station for encrypting communications between the Manager Station and the Agent Station, and designed to mutually authenticate with an Agent Station having a second digital certificate to establish a secure session between the Manager Station and the Agent Station based on the first digital certificate and the second digital certificate;
   a receiver designed to receive a request from the Agent Station for a secure file transfer protocol (SFTP) with the Manager Station;
   an encryption engine designed to encrypt the SNMP configuration file at the Manager Station; and
   a transmitter designed to transmit the encrypted SNMP configuration file to the Agent Station in response to the secure session being established,
   a transceiver designed to conduct secure SNMP communications with the Agent Station using the SNMP authentication and encryption keys.

7. The Manager Station according to claim 6, wherein the Manager Station is designed to use the SNMP authentication keys to authenticate the Agent Station.

8. The Manager Station according to claim 6, wherein the Manager Station is designed to use the SNMP encryption keys to encrypt communications sent to the Agent Station.

9. The Manager Station according to claim 6, wherein the Manager Station is designed to receive a request to generate the SNMP configuration file, wherein the request comprises SNMP configuration information comprising a desired security level to be used by the Manager Station and the Agent Station, wherein the desired security level comprises one of: (1) no authentication and encryption is not used, (2) authentication required and encryption is not used, and (3) authentication required and encryption is to be used.

10. The Manager Station according to claim 6, wherein the secure file transfer protocol (SFTP) comprises a secure file transfer protocol (SFTP) which uses certificate based authentication.

11. An Agent Station having a first digital certificate, the Agent Station comprising:
   a processor designed to: mutually authenticate with a Manager Station having a second digital certificate to establish a secure session between the Manager Station and the Agent Station based on the first digital certificate and the second digital certificate, and generate a request for a secure file transfer protocol (SFTP) with the Manager Station;
   a transmitter designed to transmit the request from the Agent Station to the Manager Station, wherein the processor is designed to establish a secure session between the Manager Station and the Agent Station based on the first digital certificate and the second digital certificate;
   a receiver designed to receive an encrypted simple network management protocol (SNMP) configuration file from the Manager Station in response the secure session being established, wherein the encrypted SNMP configuration file comprises encrypted SNMP authentication keys to be used by the Manager Station and the Agent Station for authentication; and encrypted SNMP encryption keys to be used by the Manager Station and the Agent Station for encrypting communications between the Manager Station and the Agent Station; and a decryption engine designed to decrypt the encrypted SNMP configuration file to generate SNMP authentication keys and SNMP encryption keys a transceiver designed to conduct secure SNMP communications with the Manager Station using the SNMP authentication and encryption keys.

12. The Agent Station according to claim 11, wherein the Agent Station is designed to use the SNMP authentication keys to authenticate the Manager Station.

13. The Agent Station according to claim 11, wherein the Agent Station is designed to use the SNMP encryption keys to encrypt communications sent to the Manager Station.

14. The Agent Station according to claim 11, wherein the secure file transfer protocol (SFTP) comprises a secure transfer protocol (SFTP) which uses certificate based authentication.

15. The method of claim 1, wherein the SNMP authentication and encryption keys are generated automatically, without manual configuration, by the Manager station.

16. The Manager Station of claim 6, wherein the processor is further designed to automatically generate, without manual provisioning, SNMP authentication and encryption keys.

17. The method of claim 15, wherein the SNMP authentication and encryption keys are generated periodically.

18. The Manager Station of claim 16, wherein the processor is further designed to generate SNMP authentication and encryption keys periodically.

* * * * *